United States Patent
Hayashi et al.

(10) Patent No.: US 6,741,760 B2
(45) Date of Patent: *May 25, 2004

(54) IMAGE SENSING APPARATUS WHICH INTENTIONALLY RETAINS LONGITUDINAL CHROMATIC ABERRATION

(75) Inventors: Kohtaro Hayashi, Toyonaka (JP); Hiromu Mukai, Kawachinagano (JP); Tsutomu Honda, Sakai (JP)

(73) Assignee: Minaltacco., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,044

(22) Filed: Mar. 17, 1998

(65) Prior Publication Data

US 2001/0016083 A1 Aug. 23, 2001

(30) Foreign Application Priority Data

Mar. 17, 1997 (JP) ............................................. H9-062740

(51) Int. Cl.$^7$ .............................. G06K 9/20; G06K 7/10
(52) U.S. Cl. .................... 382/321; 250/559.02; 348/96; 348/250; 348/362; 382/162
(58) Field of Search .................................. 382/162, 167, 382/321; 358/474, 475, 482, 483, 513; 250/559.02, 208.1, 216; 359/754, 755, 756, 763, 774; 348/335–342, 364, 96, 250, 362

(56) References Cited

U.S. PATENT DOCUMENTS

| | | | |
|---|---|---|---|
| 4,384,210 A | 5/1983 | Stauffer | 250/550 |
| 4,626,897 A | 12/1986 | Sato et al. | 358/44 |
| 5,038,216 A * | 8/1991 | Easterly et al. | 348/364 |
| 5,450,243 A * | 9/1995 | Nishioka | 348/340 |
| 5,463,496 A | 10/1995 | Ise | 359/497 |
| 5,680,249 A * | 10/1997 | Ishikawa et al. | 359/434 |
| 5,786,943 A * | 7/1998 | Abe et al. | 359/688 |
| 5,832,133 A * | 11/1998 | Smith | 382/254 |
| 5,898,509 A * | 4/1999 | Bianchi et al. | 358/483 |
| 5,915,047 A * | 6/1999 | Muramoto | 348/335 |
| 5,940,221 A * | 8/1999 | Okayama et al. | 359/687 |

FOREIGN PATENT DOCUMENTS

| | | | |
|---|---|---|---|
| JP | 06-289323 A | 10/1994 | |
| JP | 06-225317 | 12/1994 | H04N/9/07 |

OTHER PUBLICATIONS

Hecht, Optics, 1990, Addison–Wesley, Second Ed., p. 232.*

* cited by examiner

Primary Examiner—Timothy M. Johnson
(74) Attorney, Agent, or Firm—Sidley Austin Brown & Wood LLP

(57) ABSTRACT

An image sensing apparatus has an optical lens system and a color image sensing device. The optical lens system forms an image on the color image sensing device by means of light from an illuminated subject. The color image sensing device is a charge coupled device which has a plurality of pixels. The apparatus fulfills the conditions:

$$1.5 \times p \times FNo. < |LBg - LBe| < 5.0 \times p \times FNo.$$

$$1.5 \times p \times FNo. < |LBc - LBe| < 5.0 \times p \times FNo.$$

where p is a predetermined pitch of a photoelectrically converted pixel of said color image sensing device, LBe is a paraxial back Ad focal length of an e-line (546.07 nm in wavelength), LBg is a paraxial back focal length of a g-line (435.84 nm in wavelength), LBc is a paraxial back focal length of a C-line (656.28 nm in wavelength), and FNo. is an F-number of said optical lens.

19 Claims, 13 Drawing Sheets

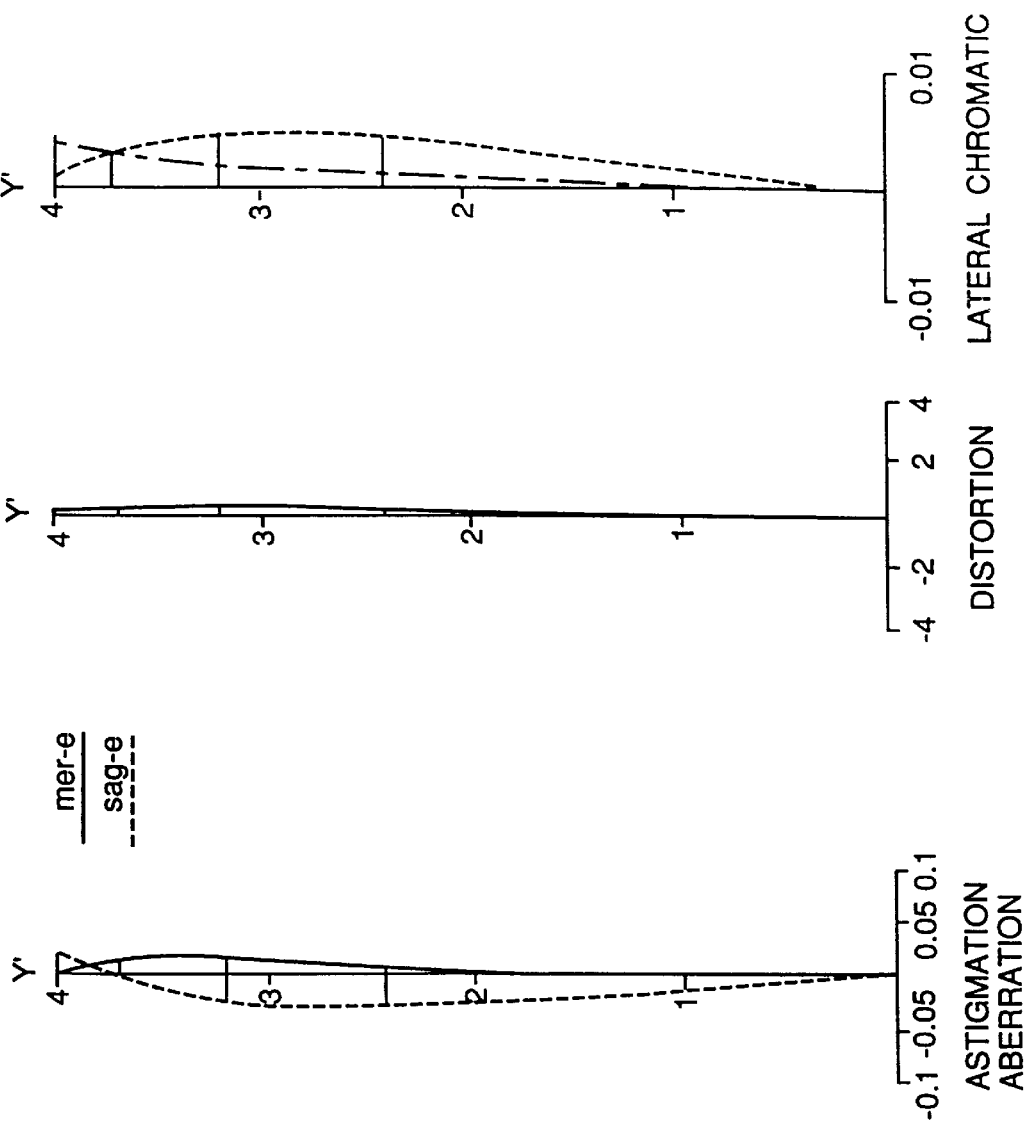

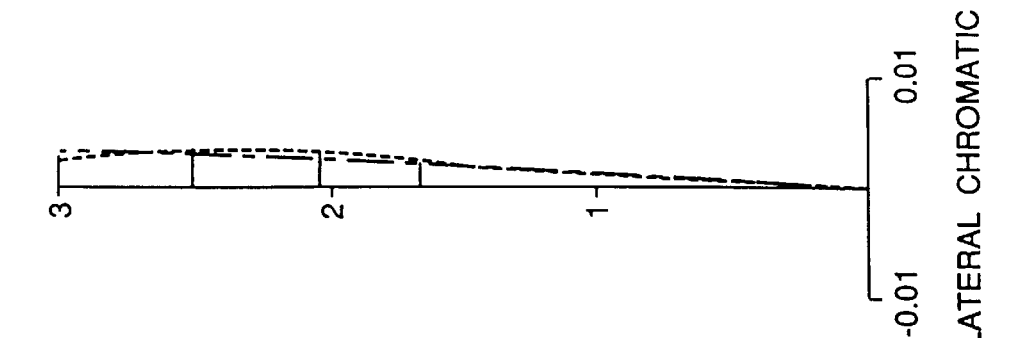
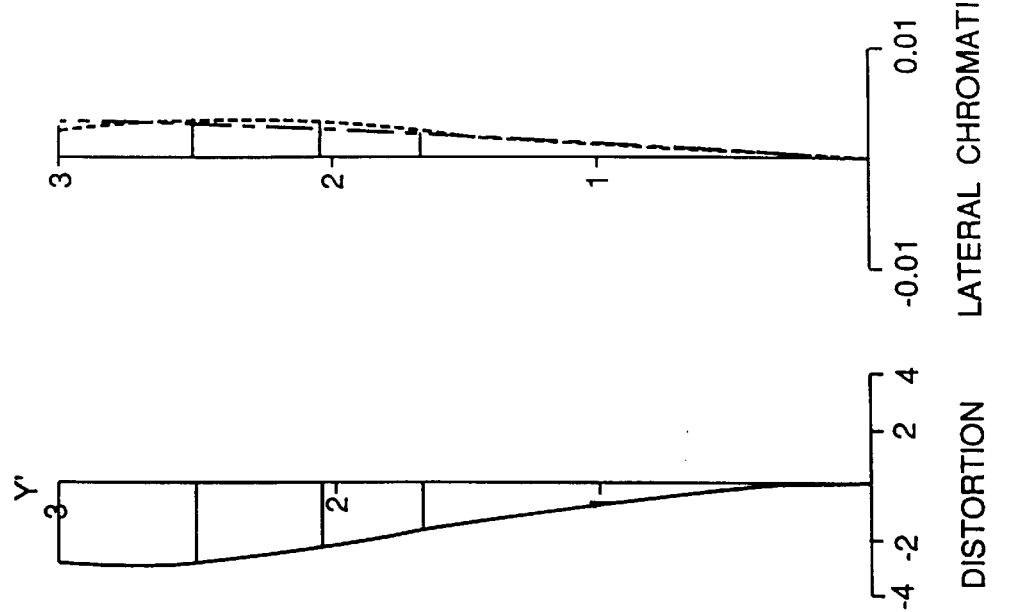
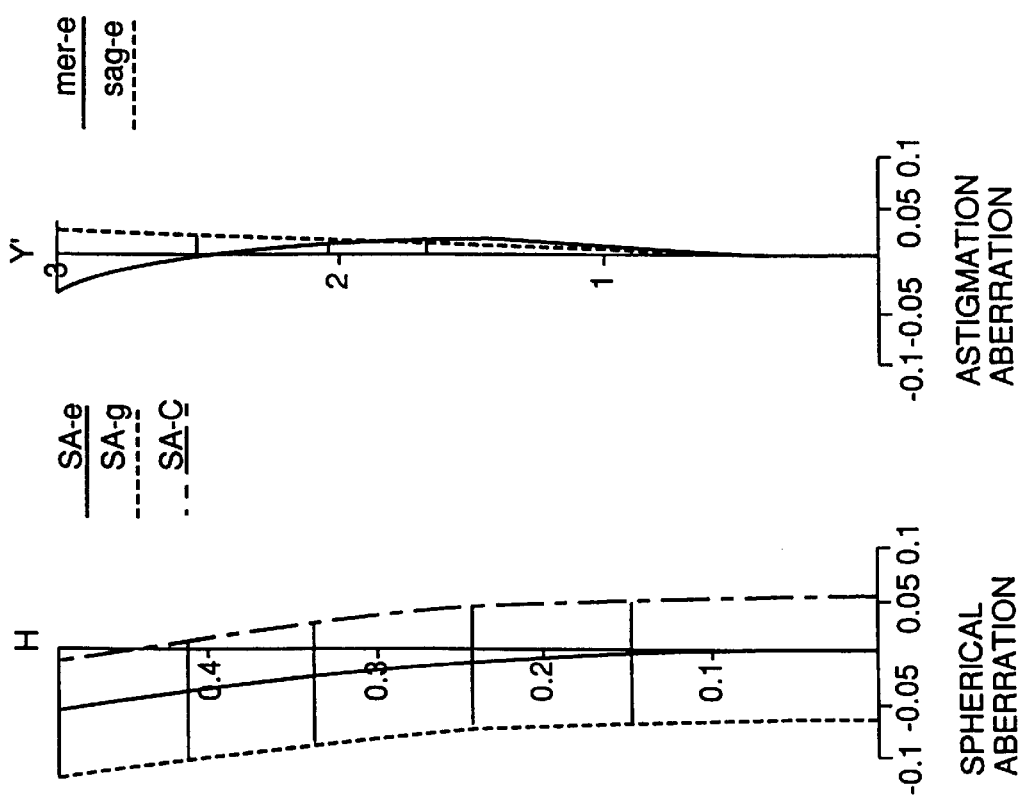

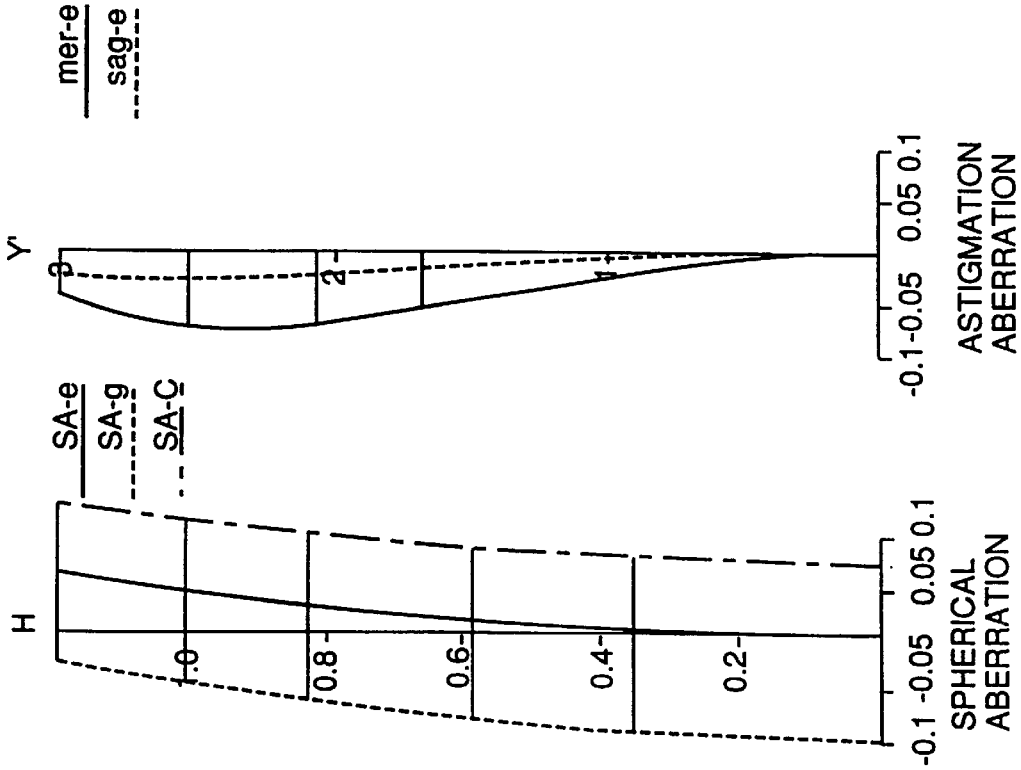

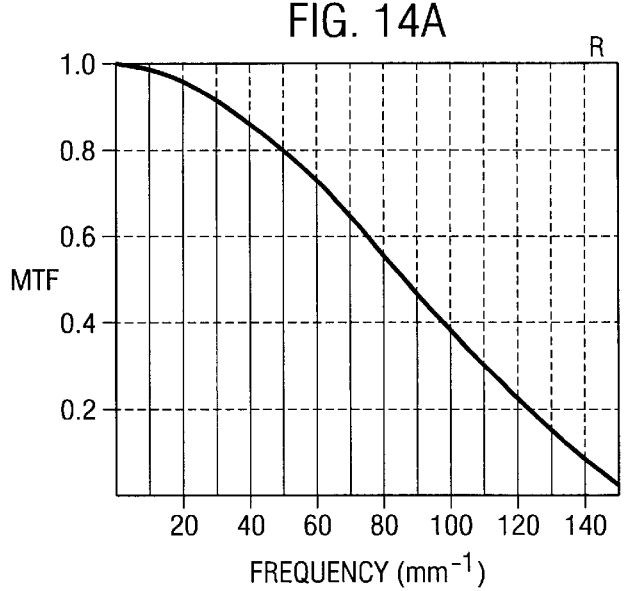
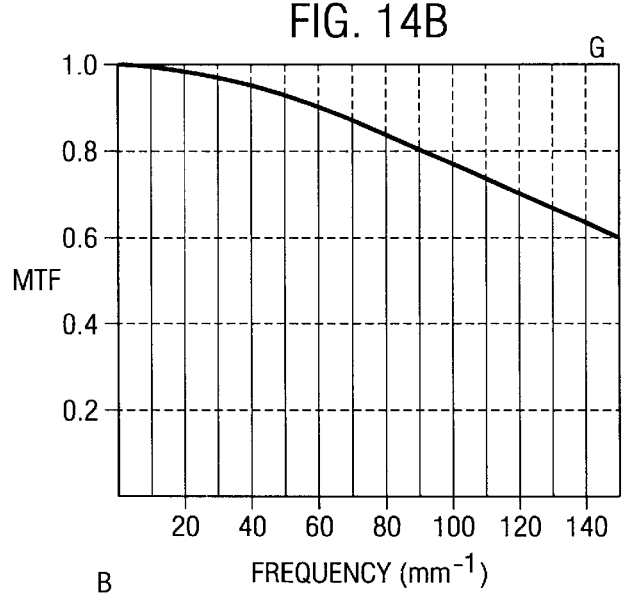
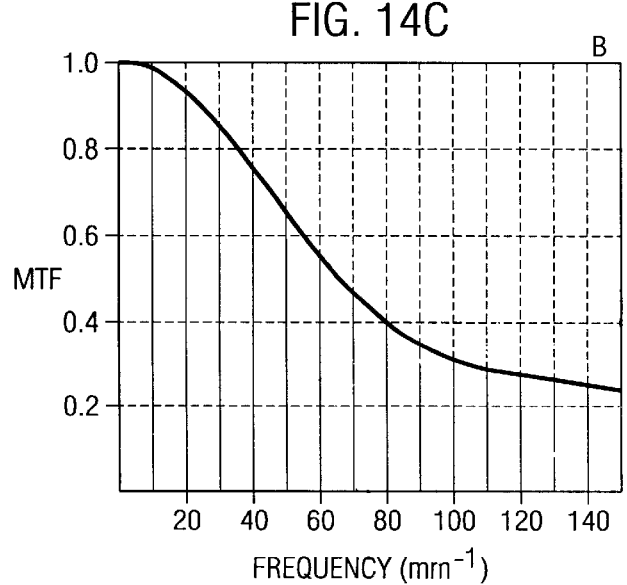

IMAGE SENSING APPARATUS WHICH INTENTIONALLY RETAINS LONGITUDINAL CHROMATIC ABERRATION

BACKGROUND OF THE INVENTION

1. Field of the Invention

The present invention relates to an optical system for forming an image on a color image sensing device such as a charge coupled device (CCD) in an image sensing apparatus for electrically capturing image information by the color image sensing device.

2. Description of the Prior Art

When image information is captured by an image sensing device such as a CCD in which pixels are uniformly spaced, for a subject of a high frequency, sampling of the uniform pixel interval causes image noise, called "aliasing noise", etc., of a low frequency, which is different from the frequency of the subject. To prevent problems caused thereby, it has conventionally been known to provide a crystal-made optical low-pass filter within the optical system of the image sensing apparatus so that the high-frequency components of the subject do not reach the image sensing device.

Recently, in order to reduce the size and cost of the image sensing apparatus, a single-plate-type CCD has been frequently used in which color filters of red (R), green (G) and blue (B) are alternately disposed as pixels of the CCD. In that case, it is common practice to increase the image performance by disposing pixels of G which appeal to the viewer's eyes the most, in a greater number than pixels of R and B. FIG. 2 shows an example of color pixel arrangement of the CCD. This arrangement is called a checkered pattern.

However, in the above-described CCD, the "aliasing noise" is conspicuous for R and B with large pixel intervals since the numbers of pixels of R and B are small, and this appears as a defect called "color moire" which is a colored noise. For such CCDs, the above-mentioned optical low-pass filter is used, particularly, for making the "color moire" inconspicuous.

A characteristic of the conventional optical system including the optical low-pass filter will be described. It is assumed that the pixel pitch p of the CCD used here is 0.005 mm. This value applies to the present embodiment. In the conventional optical system for the image sensing apparatus, in order to restrain the generation of "color moire", an optical low-pass filter in which the modulation transfer function (MTF) is 0 approximately at the Nyquist frequency vn is disposed between the lens and the CCD. Here, $vn=1/(2p)=100 \text{ mm}^{-1}$.

Therefore, the MTF characteristic of the optical system including the optical low-pass filter is as shown in FIG. 3 for all of R, G and B. In the figure, the lateral axis represents the spatial frequency and the longitudinal axis represents the MTF. The MTF here, which is 0 at the Nyquist frequency vn as shown in FIG. 3, is appropriate as the MTF for R and B images which are factors of the generation of the "color moire"; however, in the G images having a smaller pixel pitch than the R and B images, the MTF is so low that the MTF of the final image is greatly decreased.

However, when the optical low-pass filter is used, although needless high frequencies can be cut since the "color moire" is restrained, images of low frequency components are also deteriorated and, particularly, in the above-described single-plate-type CCD, high frequency components which are not unnecessary are also cut for the pixels of G. In addition, since the optical low-pass filter is very expensive, the cost of the image sensing apparatus increases.

SUMMARY OF THE INVENTION

An object of the present invention is to provide an image sensing apparatus in which the above-mentioned problems are solved, the generation of the so-called "color moire" can be restrained without the use of the optical low-pass filter, image quality is obtained which is higher than that of the conventional apparatus using the optical low-pass filter, and cost reduction is achieved.

To achieve the above-mentioned object, according to one aspect of the present invention, an image sensing apparatus is provided with: an optical lens for imaging light from an illuminated subject; and a color image sensing device for photoelectrically converting the imaged light for each color, the following conditions are fulfilled:

$$1.5*p*f\# < |LBg - LBe| < 5.0*p*f\#$$

$$1.5*p*f\# < |LBc - LBe| < 5.0*p*f\#$$

where p is a predetermined pitch of a photoelectrically converting pixel of the color image sensing device, LBe is a paraxial back focal length of the e-line (546.07 nm in wavelength), LBg is a paraxial back focal length of the g-line (435.84 nm in wavelength), LBc is a paraxial back focal length of the C-line (656.28 nm in wavelength), and f# is an F-number of the optical lens.

Moreover, the color image sensing device is a charge coupled device having photoelectrically converting pixels of primary colors of red, green and blue. Further, the amount of exposure to the color image sensing device may be controlled by varying illumination intensity for illuminating the subject. Alternatively, the amount of exposure to the color image sensing device may be controlled by varying illumination time for illuminating the subject. Moreover, the amount of exposure to the color image sensing device may be controlled by providing a filter for changing transmittance of the light from the subject on an optical path between the subject and the color image sensing device.

BRIEF DESCRIPTION OF THE DRAWINGS

This and other objects and features of this invention will become clear from the following description, taken in conjunction with the preferred embodiments with reference to the accompanying drawings in which:

FIGS. 5A to 5D are graphic representations of aberrations of the optical system according to the first embodiment of the present invention;

FIGS. 12A to 12D are graphic representations of aberrations of the optical system according to the second embodiment of the present invention at the shortest focal length condition;

FIGS. 13A to 13D are graphic representations of aberrations of the optical system according to the second embodiment of the present invention at the longest focal length condition;

FIGS. 14A to 14C show MTF characteristics of the optical system according to the second embodiment at the shortest focal length condition.

DESCRIPTION OF THE PREFERRED EMBODIMENTS

Figure 1:
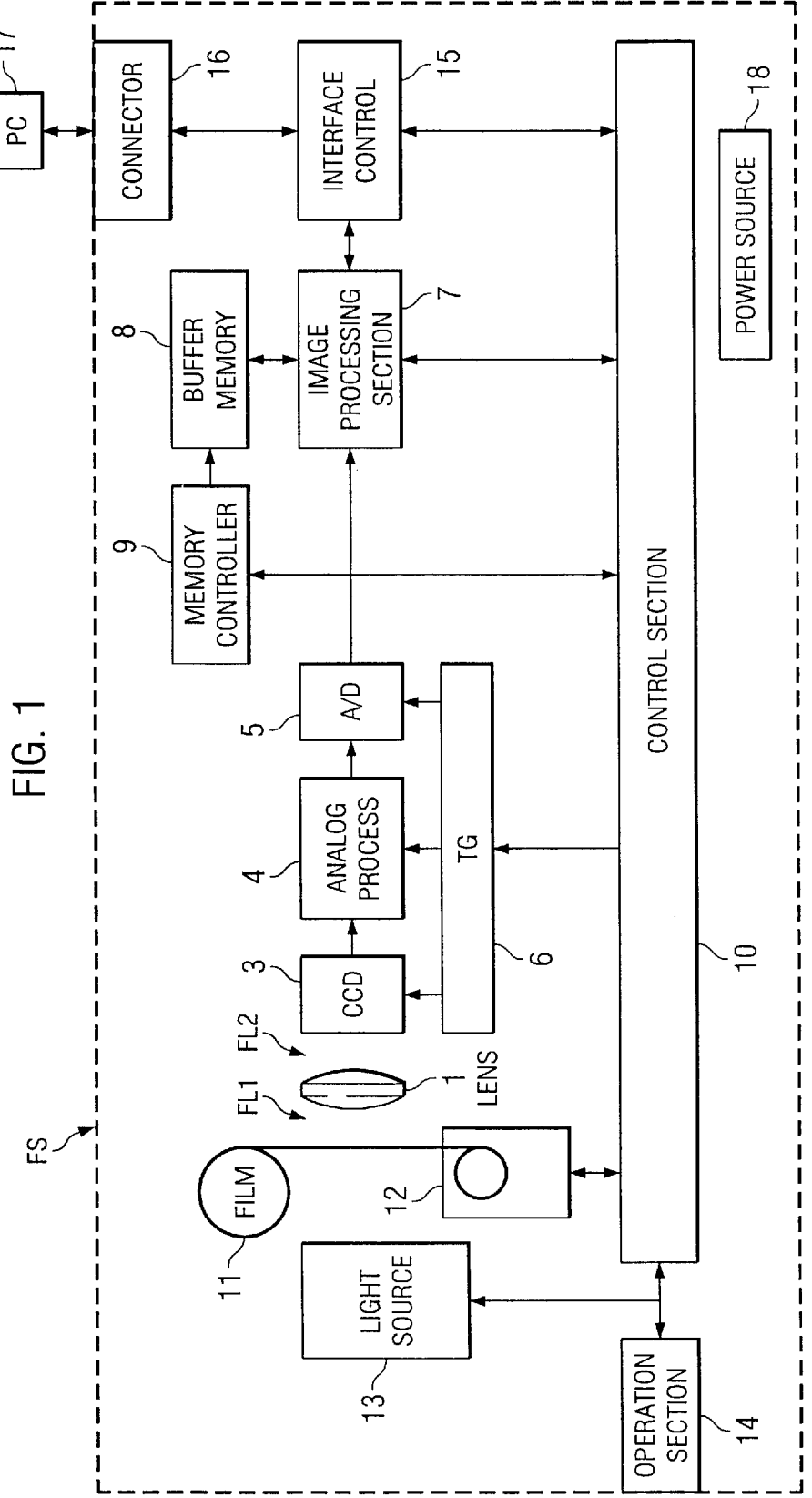
FIG. 1 is a block diagram showing the general construction of a first embodiment of the present invention.

Hereinafter, embodiments of the present invention will be described with reference to the drawings. FIG. 1 shows the general construction of a first embodiment of the present invention. This embodiment is a film image sensing apparatus (film scanner) FS for taking developed films as subjects.

In FIG. 1, reference numeral 11 represents a developed film which is a subject. The film 11 is of an advanced photo system type in which a developed film is loaded in a cartridge. Reference numeral 12 represents a feeding section for feeding the film 11. The feeding section 12 advances and rewinds the film 11 and performs reading and writing of various photographic information which is magnetically recorded on the film 11. Reference numeral 13 represents a light source for illuminating the film 11. The light source 13 consists of a fluorescent tube, a xenon tube (electronic flash) or a tungsten lamp. The image of the film 11 illuminated by the light source 13 is formed on a CCD 3 by a lens 1.

In the conventional image sensing apparatus, an optical low-pass filter is disposed between the lens 1 and the CCD 3. In this embodiment, however, the optical low-pass filter is unnecessary. The CCD 3 photoelectrically converts the formed image and outputs the photoelectrically converted image. The output from the CCD 3 is converted into an analog signal (effective value) through correlation double sampling (CDS) by an analog process circuit 4, and is then converted into a digital signal by an analog-to-digital (A/D) conversion section 5. Then, in response to this signal, an image processing section 7 performs various processings. Details of the processings will be described later.

Reference numeral 6 represents a timing generator (TG) for supplying a timing pulse to the CCD 3, the analog process circuit 4 and the A/D conversion section 5 in response to a control signal from a control section 10. In a buffer memory 8, data of taken images are temporarily stored in an appropriate format. The buffer memory 8 is controlled by a memory controller 9 in response to a control signal from the control section 10. The control section 10 controls the entire film image sensing apparatus of this construction.

Reference numeral 14 represents an operation section working on the control section 10 by directing operations such as turning on and off of the power and ejection of the film. Reference numeral 18 represents a power source section for supplying power to each section. Reference numeral 17 represents a personal computer (PC) which is used in such a manner that images are viewed on the monitor thereof and that image data are stored in a recording medium thereof. For this purpose, the personal computer 17 is connected to the main unit of the apparatus. Reference numeral 15 represents an interface control for controlling the connection with the personal computer. Basically, software which is set in the personal computer 17 transmits a control signal to the control section 10 through a connector 16, and in response to the signal, the control section 10 controls the main unit of the apparatus.

Figure 2:
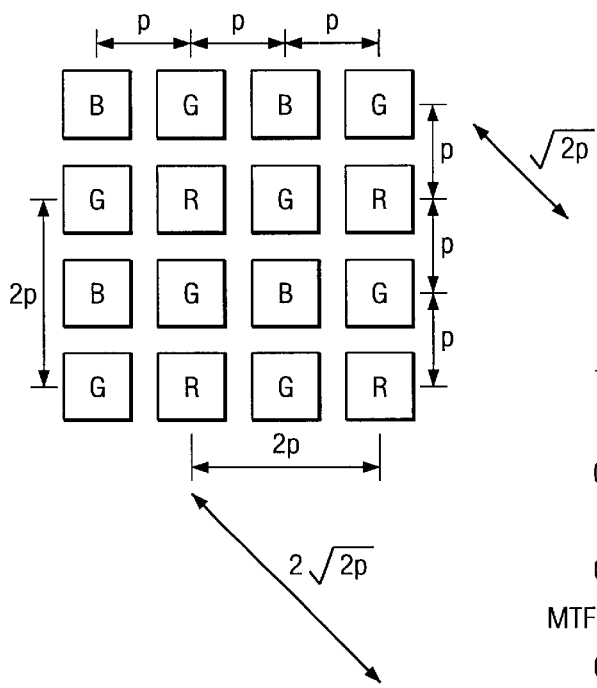
FIG. 2 shows an example of color pixel arrangement of a CCD.
Figure 3:
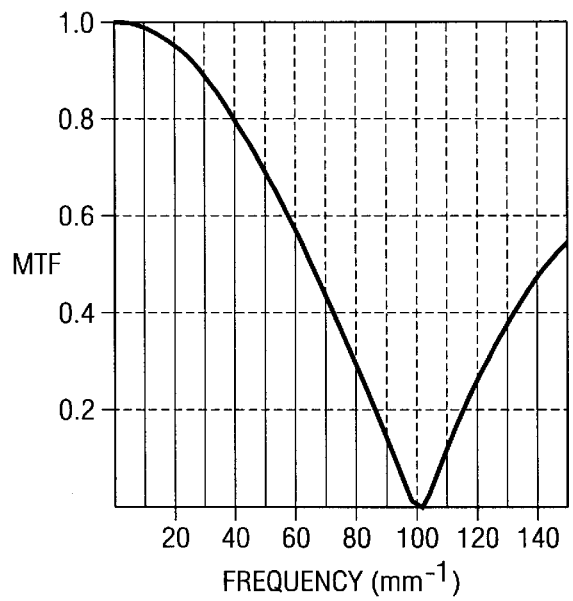
FIG. 3 shows a modulation transfer function (MTF) characteristic of a conventional optical system including an optical low-pass filter.

FIG. 2, which is a view showing an example of a color pixel arrangement of the CCD also, shows an example of pixel arrangement and pitch of the area CCD. This is a progressive scan (batch transfer) CCD having square pixels and primary color checkered color filter arrangement. This CCD transfers pixels not in a composite manner but pixel by pixel, and is suitable for taking still images. As shown in FIG. 2, when the pitch between the pixels is p, the pitch between G pixels is √2p and the pitch between B pixels and the pitch between R pixels are 2p. In the CCD of this type, luminance signals are produced from G pixels and color signals are produced from R, G and B pixels.

Figure 4:
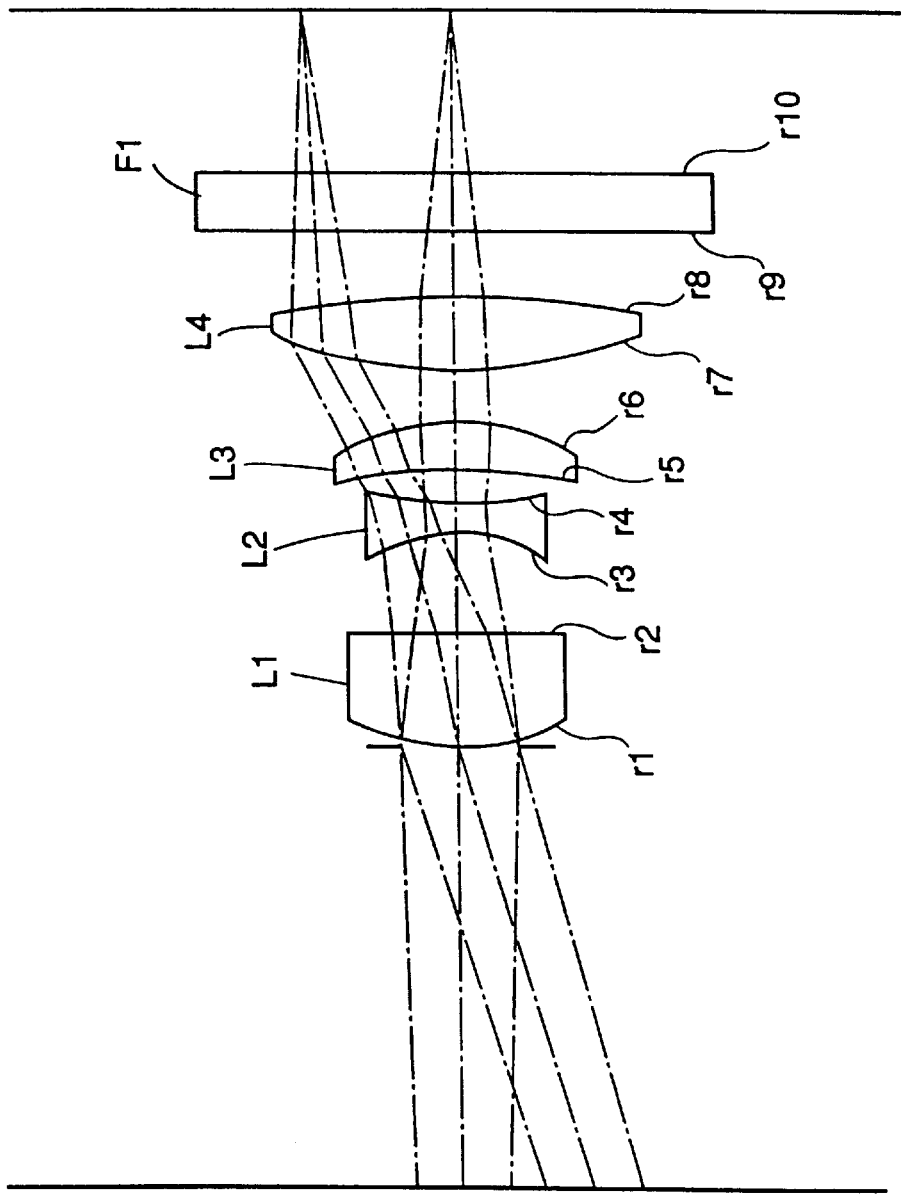
FIG. 4 shows the arrangement of an optical system according to the first embodiment of the present invention.

Subsequently, an optical system of this embodiment will be described. FIG. 4 shows the arrangement of the optical system of this embodiment. In the figure, the left side is the subject side and the right side is the CCD side. L1 to L4 represent optical lenses. F1 represents an infrared radiation (IR) cut filter for cutting needless infrared rays. As for the optical lenses, L1 is a positive lens, L2 is a negative lens, L3 is a positive lens strongly convex to the CCD side, and L4 is a positive lens strongly convex to the subject side. Construction data of the optical system of this embodiment are shown in Table 1, where the conjugate distance is 59.87 mm, the magnification is −0.2336, the F-number is 4, and the paraxial back focal length of the e-line is 4.32 mm.

TABLE 1

| Surface No. (Subject) | Radius of Curvature | Distance | Refractive Index | Dispersion (νd) |
|---|---|---|---|---|
| | | 59.87 | | |
| r1 | 6.1202 | | | |
| | | 3.00 | 1.74950 | 50.00 |
| r2 | 138.2707 | | | |
| | | 2.77 | | |
| r3 | −4.7229 | | | |
| | | 0.85 | 1.79850 | 22.60 |
| r4 | 10.3020 | | | |
| | | 0.87 | | |
| r5 | −16.7095 | | | |
| | | 1.34 | 1.85000 | 40.04 |
| r6 | −6.5391 | | | |
| | | 1.36 | | |
| r7 | 12.2037 | | | |
| | | 1.96 | 1.85000 | 40.04 |
| r8 | −35.5971 | | | |
| | | 1.80 | | |
| r9 | ∞ | | | |
| | | 1.60 | 1.51680 | 64.20 |
| r10 | ∞ | | | |

FIGS. 5A to 5D are graphic representations of aberrations of the optical system of this embodiment. FIG. 5A shows spherical aberrations. FIG. 5B shows astigmation aberrations. FIG. 5C shows distortion. FIG. 5D shows lateral chromatic aberrations. Taking a look at the spherical aberrations of the e-line, the g-line and the C-line shown in FIG. 5A, it is apparent that the paraxial back focal lengths and the longitudinal chromatic aberrations of the g-line and the C-line are greatly shifted from those of the e-line. The other aberrations are excellent.

Figure 6A:
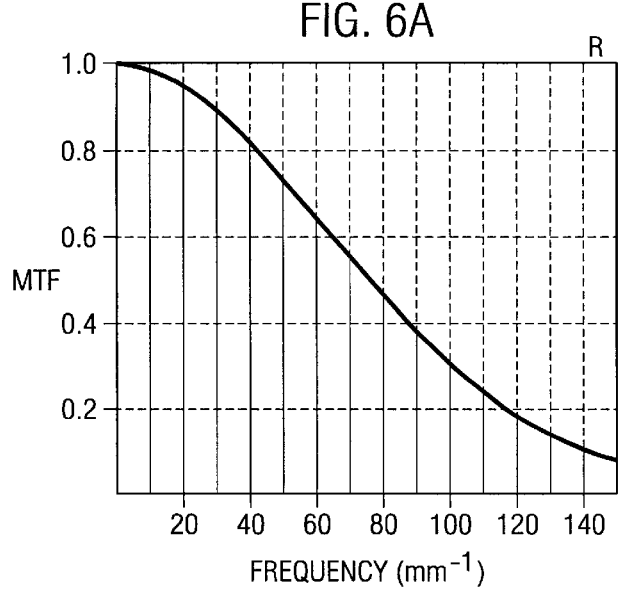
FIGS. 6A to 6C show MTF characteristics of the optical system according to the first embodiment.
Figure 6B:
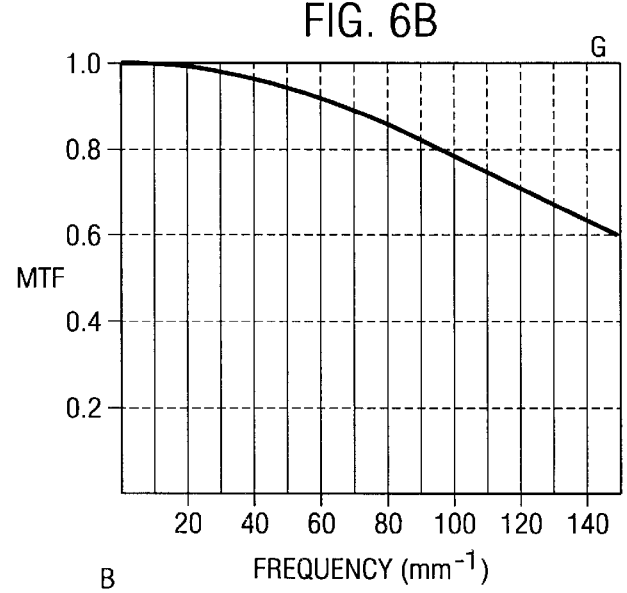
Figure 6C:
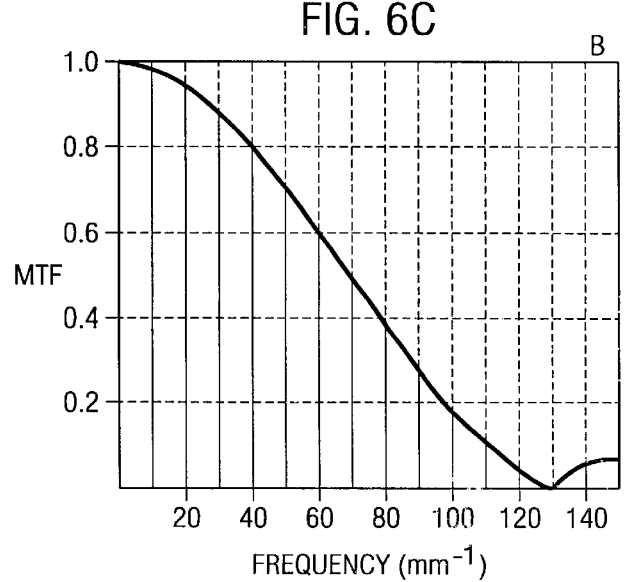

FIGS. 6A to 6C shows MTF characteristics of R, G and B in the optical system of this embodiment, respectively. The CCD light receiving surface of the optical system of this embodiment is disposed substantially in the position of the paraxial back focal length of the e-line. In these figures, the light receiving sensitivities of R, G and B of the CCD each have peaks substantially at the C-line (656.28 nm in wavelength), the e-line (546.07 nm in wavelength) and the g-line (435.84 nm in wavelength), and since the paraxial back focal lengths are intentionally shifted from the paraxial back focal length of the e-line, the R and B images are defocused, so that as shown in FIGS. 6A and 6C, the image performance for R and B is degraded to the vicinity of 0 approximately at the Nyquist frequency vn ($=100$ mm$^{-1}$). For this reason, the "color moire" is not generated even though the optical low-pass filter is not disposed.

As shown in FIG. 6B, the MTF for G pixels having the peak of the light receiving sensitivity approximately at the e-line where the best focus condition is achieved in the optical system of this embodiment has a high value even at the Nyquist frequency vn. From this, it is understood that the reduction in contrast is small. That is, according to the optical system of this embodiment, the "color moire" can be prevented without the use of the optical low-pass filter, and since the contrast of green G is high, the quality of the images is high. That is, improvement of image quality is achieved while the cost is reduced.

Figure 7:
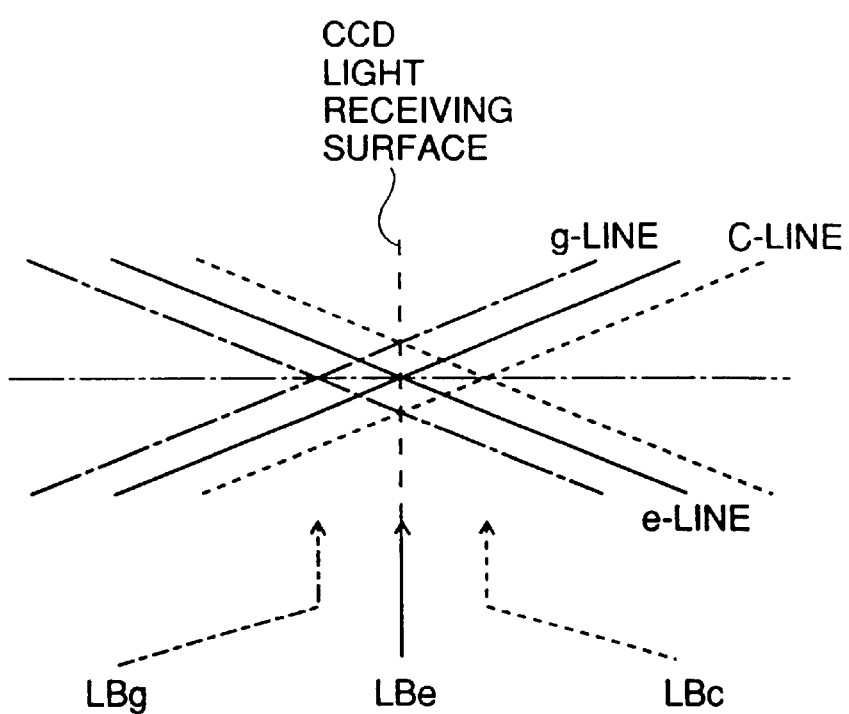
FIG. 7 schematically shows a paraxial back focal length shift.

In order to fully achieve the effects of this embodiment, the MTFs for the g- and C-lines are necessarily 0 approximately at the Nyquist frequency vn, and to realize this, the point images thereof are necessarily blurred images with a diameter of approximately 2.44*p for the pixel pitch p. To obtain this state, the amounts of shift of the paraxial back focal lengths of the g- and C-lines from the paraxial back focal length of the e-line are set to approximately 2.44*p*f#. FIG. 7 schematically shows this state. In the figure, LB represents the position of the paraxial back focal length of each line indicated by a small letter.

The value 2.44*p is obtained by Fourier-transforming a blur of a circle to obtain frequency characteristics and calculating backward the diameter of a circle in which the MTF is 0 at the Nyquist frequency vn ($=1/(2p)$). The MTF characteristic of a circle with a radius r is expressed by $$MTF(v)=2-J1\ (2\pi rv)/2\pi rv.$$

Here, J1 is a Bessel's linear function.

In actuality, however, the appropriate amount of the paraxial back focal length shift varies according to spherical aberration, etc. of the lens. Further, although longitudinal chromatic aberration is intentionally generated, the generation of lateral chromatic aberration caused thereby is undesirable, and kinds of glass used for the optical system are limited. For these reasons, it is difficult to design the optical system so as to exactly fulfill predetermined conditions. In view of this fact, by fulfilling the following conditions, images which are better than conventional images are obtained:

$$1.5*p*f\#<|LBg-LBe|<5.0*p*f\# \quad (1)$$

$$1.5*p*f\#<|LBc-LBe|<5.0*p*f\# \quad (2)$$

When the lower limits of the conditions are exceeded, the "color moire" is generated unless the optical low-pass filter is used. When the upper limits of the conditions are exceeded, the R and B images are greatly reduced in contrast, so that the image quality degrades. Further, by fulfilling the following conditions:

$$2.0*p*f\#<|LBg-LBe|<4.0*p*f\# \quad (3)$$

$$2.0*p*f\#<|LBc-LBe|<4.0*p*f\# \quad (4)$$

excellent images are obtained while the "color moire" is prevented.

In this embodiment, the CCD pixel pitch P=0.005 mm, the f#=4.0, LBg−LBe=−0.053 mm, and LBc−LBe=0.063 mm. In order for the above-described conditions to be fulfilled in a fixed focal length lens system comprising a positive lens, a negative lens, a positive lens and a positive lens shown in this embodiment, it is desirable that at least two of the three positive lenses should fulfill vd<45 and the negative lens should fulfill vd<30.

Figure 8:
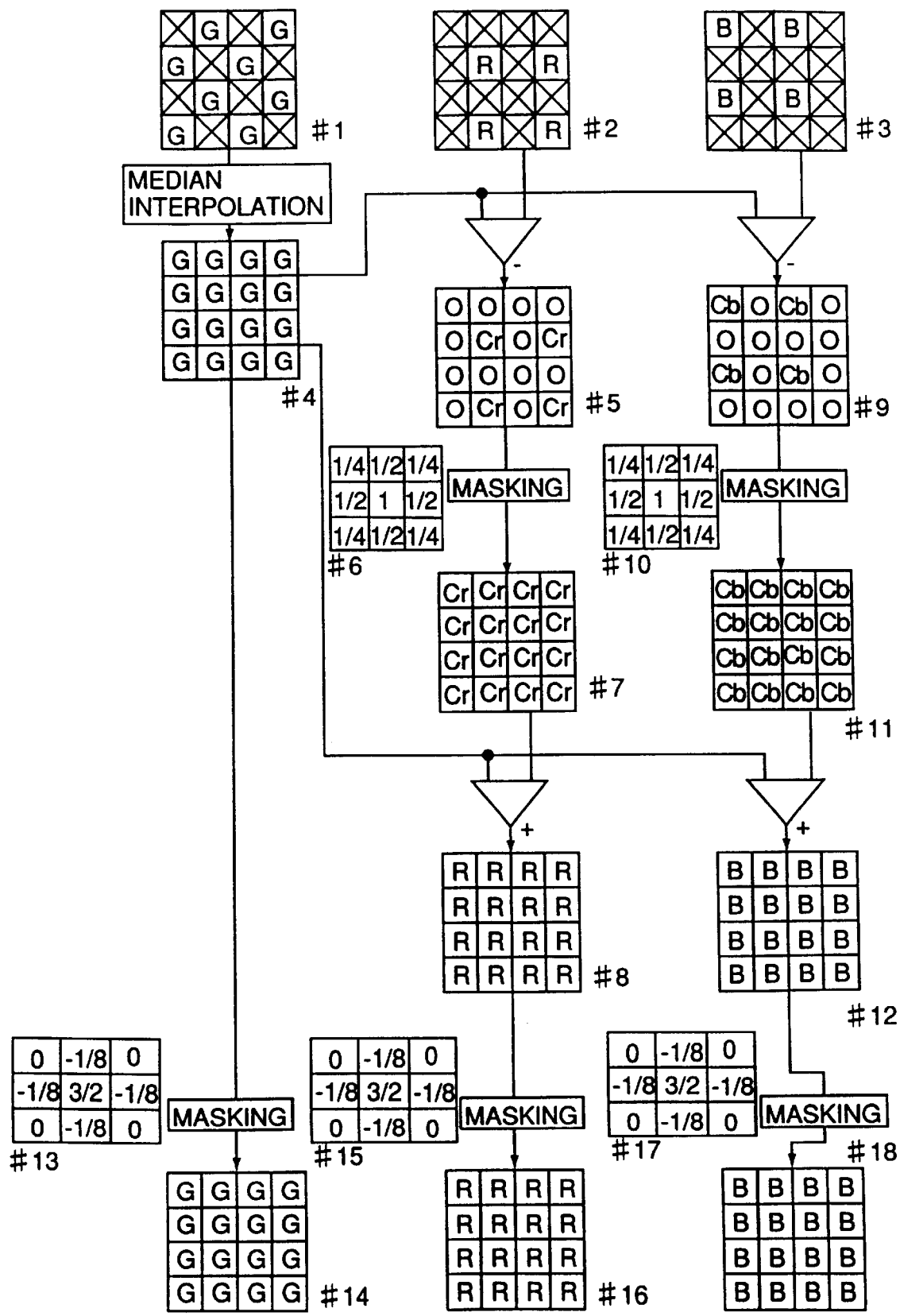
FIG. 8 shows a detailed flow of an image information calculation.

Subsequently, processing of the image data obtained by the CCD will be described. FIG. 8 shows a detailed flow of an image information calculation by interpolation calculation. Taking a look at the obtained image data for each color filter, when the CCD 3 of this embodiment is used, there are pixels where no image data are present as shown by x marks at steps #1, #2 and #3 of FIG. 8. Therefore, in the image processing section 7 shown in FIG. 1, interpolation is performed for calculating lacking image information. While in the image processing section 7, processing such as γ processing is performed on the A/D converted data from the CCD 3 in addition to the interpolation calculation, this is not shown in FIG. 8.

Figures 9A, 9B:
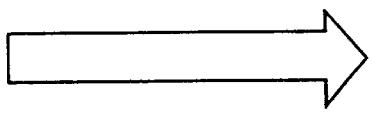
FIGS. 9A and 9B are views of assistance in explaining interpolation calculation and masking.

Specifically, in FIG. 8, first, lacking image data are calculated for the G image shown at step #1 by the interpolation calculation to obtain the state shown at step #4. There are several methods for the interpolation calculation and this embodiment employs a median interpolation in which, as shown in FIG. 9A, when the lacking pixel to be calculated is G0 and the pixels around the pixel G0 whose values have already been obtained are G1, G2, G3 and G4, two pixels selected from among the pixels G1 to G4 excepting the highest and the lowest ones are denoted by Ga and Gb, the average between the pixels Ga and Gb is obtained and the pixel G0 is set to (Ga+Gb)/2. Other methods include an average interpolation in which the average of the four pixels is obtained and the pixel G0 is set to (G1+G2+G3+G4)/4.

Then, by subtracting the image information of G shown at step #4 from the image information of R shown at step #2, color difference information Cr is calculated to obtain the state shown at step #5. However, since the image information of R still includes pixels where no image data are present, the color difference information is set to 0 for the pixels. On the color difference information shown at step #5, pattern masking is performed at step #6. Pattern masking is used to calculate, when the original image has pixels A1 to A9, new image information for the pixel A5 from the pixel A5 and the surrounding eight pixels and mask patterns M1 to M9 by A5'=Σ(Mi*Ai).

The result of the masking performed on the color difference information shown at step #5 by the mask pattern shown at step #6 is shown at step #7. By adding the image information of G shown at step #4 to the image information shown at step #7, image information of R shown at step #8 is obtained.

Moreover, by subtracting the image information of G shown at step #4 from the image information of B shown at step #3, color information Cb is calculated to obtain the state shown at step #9. However, since the image information of B still includes pixels where no image data are present, the color difference information is set to 0 for the pixels. On the color difference information shown at step #9, pattern masking is performed at step #10. This processing is the same as that described above with reference to FIG. 9B.

The result of the masking performed on the color difference information shown at step #9 by the mask pattern shown at step #10 is shown at step #11. Then, by adding the image information of G shown at step #4 to the image information shown at step #11, the image information of B shown at step #12 is obtained.

With respect to the interpolation of lacking image data for the images of R and B, while interpolation may be directly performed on the image information shown at steps #2 and #3 obtained by the CCD 3, in this embodiment, as described above, interpolation (masking) is performed after the difference from the image information of G shown at step #4 is obtained and then, the image information of G shown at step #4 is added again. This is because in the optical system of this embodiment in which the MTFs of the images of R and B are low, better image quality is obtained by performing interpolation on the difference from the image information of G than by directly performing the interpolation on the image information obtained by the CCD.

Normally, enhancement is performed in order to further increase the contrast. FIG. 8 shows a manner of obtaining the image information shown at steps #14, #16 and #18 by performing masking on the image information of G, R and B shown at steps #4, #8 and #12 by the same mask patterns shown at steps #13, #15 and #17. As the mask patterns for the enhancement, different mask patterns may be used for R, G and B, respectively.

In the film image sensing apparatus of this embodiment shown in FIG. 1, the developed film 11 is used. In the developed film 11, the density varies according to the exposure condition at the time of photographing with a camera and the like. Therefore, when the film 11 in which the density varies is used for this embodiment, the amount of exposure to the CCD 3 varies, so that the light quantity becomes insufficient or excessive. However, in the optical system of this embodiment, if the F-number of the lens 1 is varied in order to adjust the brightness, the amounts of the paraxial back focal length shift of R and B images vary, so that the effect of restraining the generation of the "color moire" cannot be obtained.

Therefore, in this embodiment, in order to maintain appropriate exposure to the CCD 3, the illuminance of light from the light source 13 to the film 11 is controlled by the control section 10. Other methods include controlling the time of exposure to the CCD 3 or controlling the time of integration in the CCD 3 by the control section and inserting a filter for changing the transmittance on the optical path between the film 11 and the CCD 3, at positions indicated by FL1 and FL2 in FIG. 1.

Figure 10:
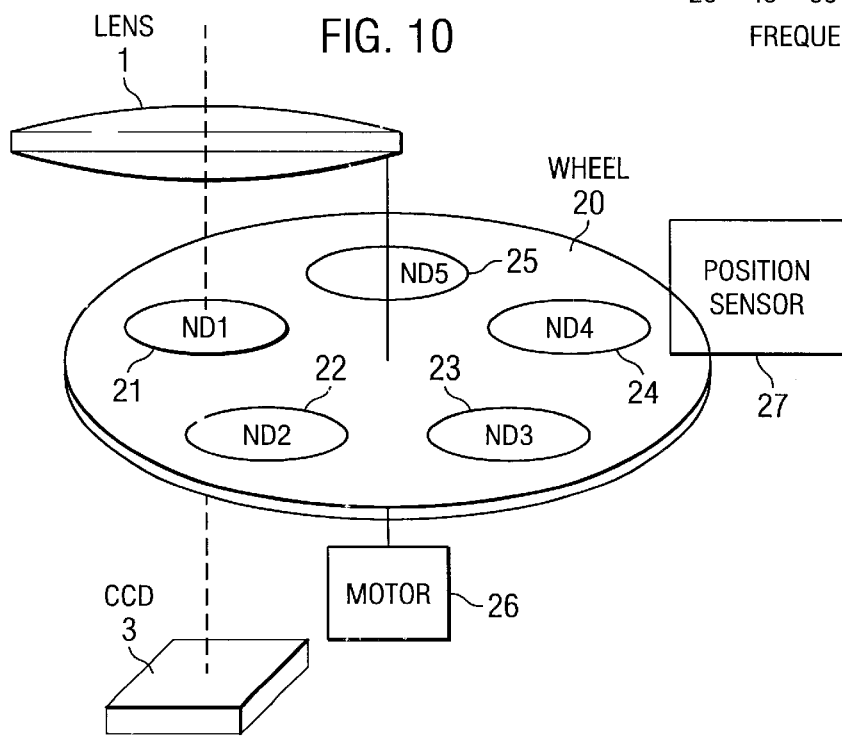
FIG. 10 schematically shows an example of a filter for changing transmittance.

FIG. 10 schematically shows an example of the filter for changing the transmittance. As shown in the figure, on a wheel 20 connected to the rotational axis of a motor 26, neutral density (ND) filters 21 to 25 having different transmittances are disposed around the rotational axis. Switching of the ND filter situated on the optical path between the lens 1 and the CCD 3 is performed among the filters 21 to 25 by rotating the wheel 20 in conjunction with the rotation of the motor 26. Reference numeral 27 represents a rotation position detecting sensor.

In this embodiment, the "color moire" is prevented by intentionally generating longitudinal chromatic aberration for the images of R and B. However, since the image of G has excellent performance, there is a possibility that "aliasing noise" is generated at a higher frequency than the frequency at which the "color moire" is generated. In order to prevent this, an optical low-pass filter may be used. Since the optical low-pass filter for preventing the "aliasing noise" for the image of G cuts only higher frequencies than the optical low-pass filter for preventing the "color moire" in the normal image sensing apparatus, the image quality is better than in the case where the optical low-pass filter for preventing the "color moire" is used.

Figure 11:
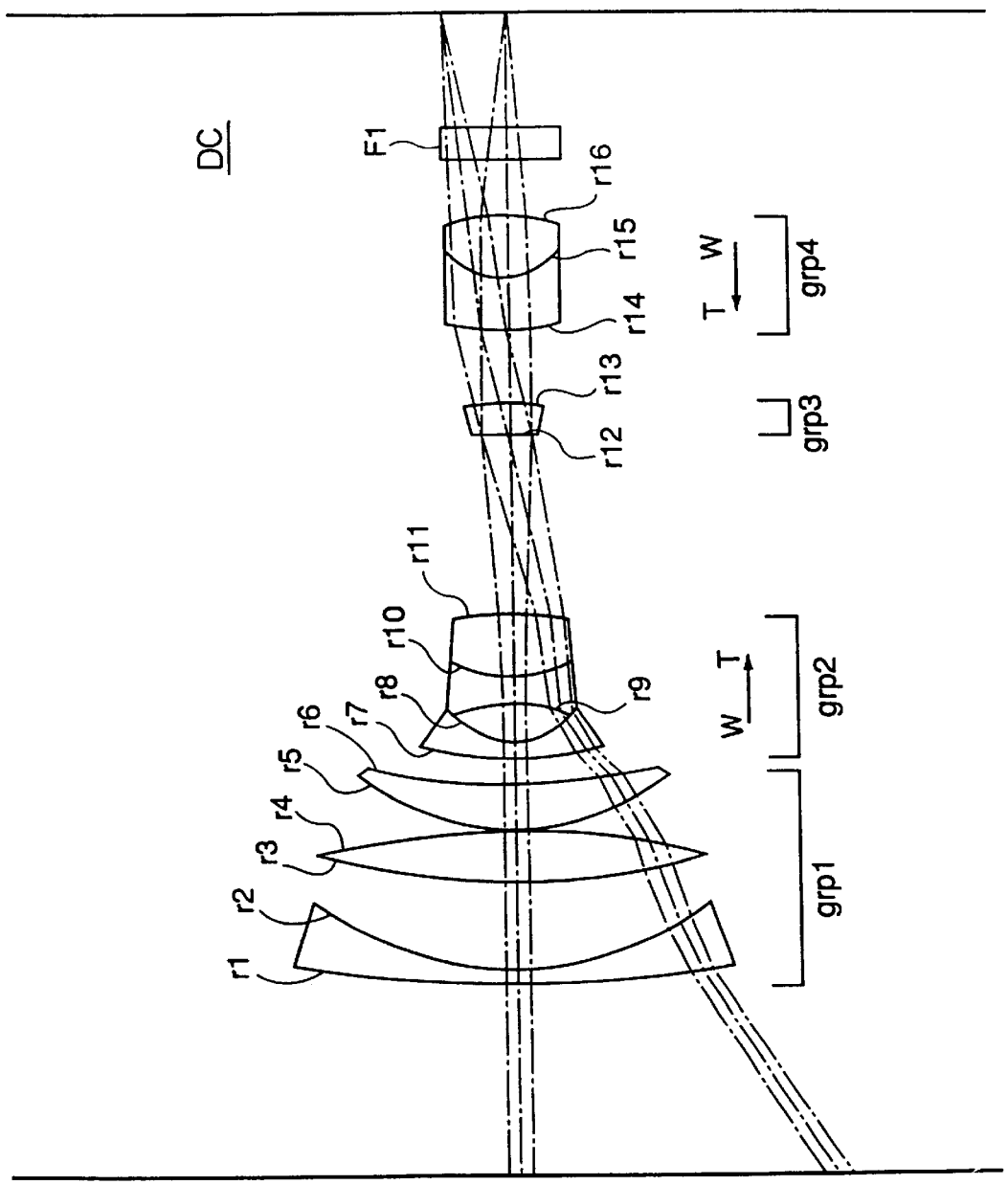
FIG. 11 shows the arrangement of an optical system according to a second embodiment of the present invention.
Figure 15A:
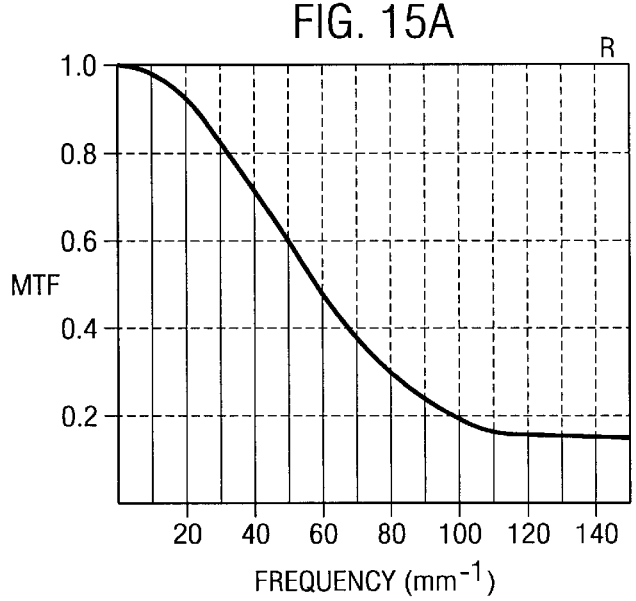
FIGS. 15A to 15C show MTF characteristics of the optical system according to the second embodiment at the longest focal length condition.
Figure 15B:
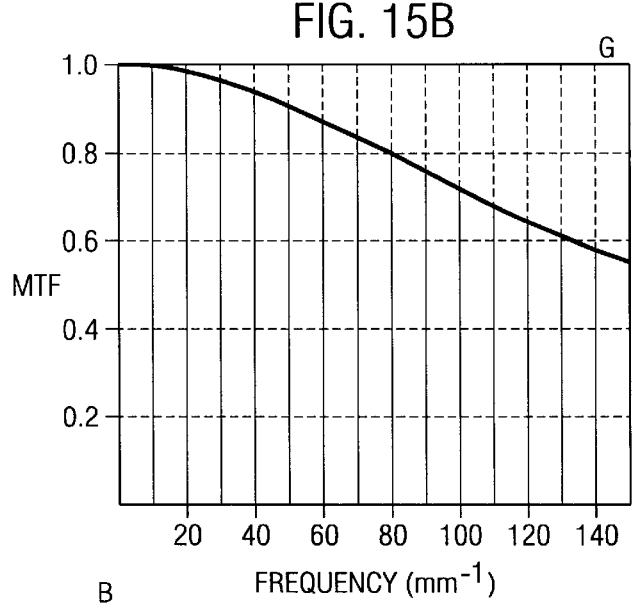
Figure 15C:
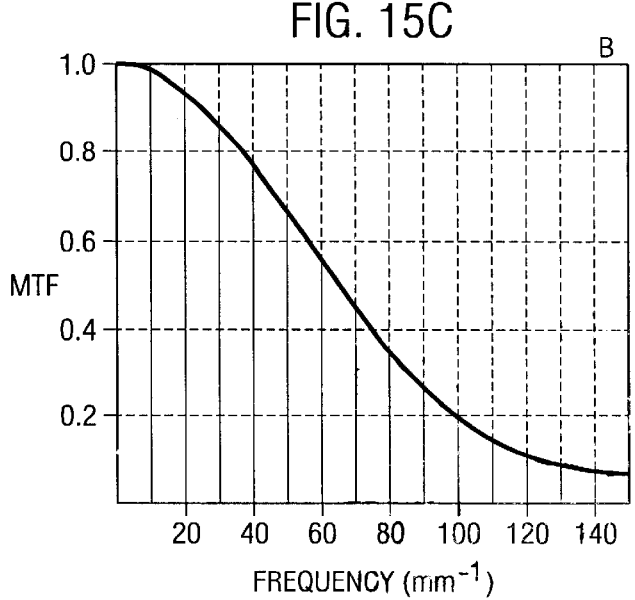

FIG. 11 shows the arrangement of an optical system according to a second embodiment of the present invention. This is a zoom optical system for a digital camera (DC) using a CCD as the image sensing device. In the figure, the left side is the subject side and the right side is the image plane side. The optical lens comprises a first lens unit (grp1) of positive refractive power including a negative lens element, a positive lens element and a positive lens element, a second lens unit (grp2) of negative refractive power including a negative lens element and a doublet lens consisting of a negative and a positive lens elements, a third lens unit (grp3) of positive refractive power including an aperture stop and a positive lens element, and a fourth lens unit (grp4) including a doublet lens consisting of a negative and a positive lens elements. F1 represents an IR cut filter.

As shown in FIG. 11, as the focal length varies from a shorter focal length condition to a longer focal length condition by zooming, the negative second lens unit moves toward the image plane side and the positive fourth lens unit moves toward the subject side in the directions of the arrows. Construction data of the optical system of this embodiment are shown in Table 2. Here, the focal length is 4.83 to 13 mm, the F-number is 5 to 5.5, and the paraxial back focal length of the e-line is 6 mm.

TABLE 2

| Surface No. | Radius of Curvature | Distance | Refractive Index | Dispersion (vd) |
|---|---|---|---|---|
| r1 | 53.3624 | | | |
| | | 0.85 | 1.71834 | 25.65 |
| r2 | 17.3523 | | | |
| | | 4.60 | | |
| r3 | 36.4389 | | | |
| | | 2.54 | 1.56229 | 61.92 |
| r4 | −53.4774 | | | |
| | | 0.10 | | |
| r5 | 13.2604 | | | |
| | | 2.32 | 1.75410 | 51.58 |
| r6 | 34.4813 | | | |
| | | 1.50~8.99 | | |
| r7 | 16.9142 | | | |
| | | 0.70 | 1.85000 | 40.04 |
| r8 | 4.1835 | | | |
| | | 2.08 | | |
| r9 | −10.7918 | | | |
| | | 1.54 | 1.70255 | 53.51 |
| r10 | 8.2069 | | | |
| | | 3.00 | 1.84735 | 26.15 |
| r11 | −34.2387 | | | |
| | | 9.49~2.00 | | |
| r12 | 37.5038 | | | |
| | | 1.67 | 1.80547 | 37.36 |
| r13 | −26.2381 | | | |
| | | 3.72~1.35 | | |
| r14 | 12.8661 | | | |
| | | 3.00 | 1.79850 | 22.60 |
| r15 | 4.4629 | | | |
| | | 2.88 | 1.65837 | 55.54 |
| r16 | −14.9817 | | | |
| | | 3.00~5.37 | | |

TABLE 2-continued

| Surface No. | Radius of Curvature | Distance | Refractive Index | Dispersion (vd) |
|---|---|---|---|---|
| r17 | ∞ | | | |
| | | 1.60 | 1.51680 | 64.20 |
| r18 | ∞ | | | |

This embodiment has a non-illustrated automatic focusing mechanism, and focusing is performed by moving the negative second lens unit in the direction along the optical axis so that the image of G of the subject image is excellent on the CCD. The second embodiment is not designed to photograph subjects at the same distance like the first embodiment but is designed to photograph subjects at distances which are different to some extent. Therefore, the effects should be difficult to obtain because when a subject at a distance is in focus, subjects at other distances are out of focus. However, in actuality, this does not become a problem because the lens, having an F-number of not less than 4, is dark and has a large depth of focus and the variation in subject distance in one photograph falls within a certain photographic range.

FIGS. 12A to 12D are graphic representations of aberrations of the optical system of this embodiment at the shortest focal length condition. FIGS. 13A to 13D are graphic representations of aberrations at the longest focal length condition. FIGS. 12A and 13A show spherical aberrations. FIGS. 12B and 13B show astigmation aberrations. FIGS. 12C and 13C show distortion. FIGS. 12D and 13D are lateral chromatic aberrations. Taking a look at the spherical aberrations of the e-line, the g-line and the C-line shown in FIGS. 12A and 13A, the paraxial back focal lengths and the longitudinal chromatic aberrations of the g-line and the C-line are shifted from those of the e-line like in the first embodiment. The other aberrations are excellent.

The paraxial back focal lengths of the g-line and the C-line for the e-line are as follows:

at the shortest focal length condition:

LBg–LBe=–0.070 mm, LBc–LBe=+0.053 mm at the longest focal length condition:

LBg–LBe=–0.100 mm, LBc–LBe=+0.074 mm

At this time, the signs of the paraxial back focal length of the g-line at the shortest focal length condition and at the longest focal length condition are the same. This applies to the paraxial back focal length of the C-line.

When the signs are different in a zoom lens, even though the conditions (1) and (2) or (3) and (4) are fulfilled at each of the shortest and the longest focal length conditions, the paraxial back focal length difference decreases when the focal length is varied from a shorter focal length condition to a longer focal length condition, so that the conditions are not fulfilled. Therefore, in a zoom lens, it is preferred that the directions of the paraxial back focal length shift at the shortest focal length condition and at the longest focal length condition should be the same.

In the zoom lens system of this embodiment comprising the four units of the positive, negative, positive and positive lens units, in order to fulfill the conditions (1) and (2) or (3) and (4), it is desirable that the dispersion vd of the positive third lens unit should fulfill vd<45. FIGS. 14A to 14C and 15A to 15C show MTF characteristics of the optical system of this embodiment for each of R, G and B at the shortest focal length condition and at the longest focal length condition. In these cases, the MTF characteristics are similar to those shown in FIGS. 6A to 6C with respect to the optical system of the first embodiment.

As described above, according to the present invention, an image sensing device is provided in which the generation of the so-called "color moire" can be restrained without the use of the optical low-pass filter, image quality is obtained which is higher than that of the conventional apparatus using the optical low-pass filter, and cost reduction is achieved. obviously, many modifications and variations of the present invention are possible in light of the above teachings. It is therefore to be understood that within the scope of the appended claims, the invention may be practiced other than as specifically described.

What is claimed is:

1. An image sensing apparatus comprising:
   an optical lens system for imaging light from an illuminated subject; and
   a color image sensing device for photoelectrically converting imaged light for each color,
wherein the following conditions are fulfilled so that longitudinal chromatic aberration of the optical lens system is set so as to reduce moire noise in the color image sensing device without a low pass filter element:

$$1.5*p*f\# < |LBg-LBe| < 5.0*p*f\#$$
$$1.5*p*f\# < |LBc-LBe| < 5.0*p*f\#$$

where p is a predetermined pitch of a photoelectrically converting pixel of said color image sensing device, LBe is a paraxial back focal length of an e-line (546.07 nm in wavelength), LBg is a paraxial back focal length of a g-line (435.84 nm in wavelength), LBc is a paraxial back focal length of a C-line (656.28 nm in wavelength), and f# is an F-number of said optical lens system.

2. An image sensing apparatus as claimed in claim 1, wherein an amount of exposure to said color image sensing device is controlled by varying illumination intensity for illuminating said subject.

3. An image sensing apparatus as claimed in claim 1, wherein an amount of exposure to said color image sensing device is controlled by varying illumination time for illuminating said subject.

4. An image sensing apparatus as claimed in claim 1, wherein an amount of exposure to said color image sensing device is controlled by providing a filter for changing transmittance of light from said subject on an optical path between said subject and said color image sensing device.

5. An image sensing apparatus as claimed in claim 1, wherein said color image sensing device is a charge coupled device having photoelectrically converting pixels of primary colors of red, green and blue.

6. An image sensing apparatus as claimed in claim 5, wherein an amount of exposure to said color image sensing device is controlled by varying illumination intensity for illuminating said subject.

7. An image sensing apparatus as claimed in claim 5, wherein an amount of exposure to said color image sensing device is controlled by varying illumination time for illuminating said subject.

8. An image sensing apparatus as claimed in claim 5, wherein an amount of exposure to said color image sensing device is controlled by providing a filter for changing transmittance of light from said subject on an optical path between said subject and said color image sensing device.

9. An image sensing apparatus as claimed in claim 1, wherein said apparatus is a film scanner.

10. An image sensing apparatus as claimed in claim 1, wherein said apparatus is a camera.

11. An image sensing apparatus as claimed in claim 1, wherein the following conditions are fulfilled:

$$2.0*p*f\# < |LBg-LBe| < 4.0*p*f\#$$

$$2.0*p*f\# < |LBc-LBe| < 4.0*p*f\#.$$

12. An image sensing apparatus as claimed in claim 1, further comprising an image data processor for processing thus photoelectrically converted imaged light for each color, said image data processor including:

a green image data creator for creating green image information, said green image data creator generating lacking green image data by interpolation of existing green image data, and combining said existing green data and said thus generated lacking green image data thereby creating said green image information;

a red image data creator for creating red image information, said red image data creator subtracting said green image information from existing red image data thereby creating existing red-green image data, masking said thus created existing red-green image data to generate lacking red-green image data, combining said thus created existing red-green image data and said thus generated lacking red-green image data, and adding said green image information thereby creating said red image information; and a blue image data creator for creating blue image information, said blue image data creator subtracting said green image information from existing blue image data thereby creating existing blue-green image data, masking said thus created existing blue-green image data to generate lacking blue-green image data, combining said thus created existing blue-green image data and said thus generated lacking blue-green image data, and adding said green image information thereby creating said blue image information.

13. An image sensing apparatus comprising:

an optical lens system for imaging light from an illuminated subject;

a color image sensing device for photoelectrically converting imaged light for each color; and means for controlling an amount of exposure to said color image sensing device, wherein the following conditions are fulfilled so that longitudinal chromatic aberration of the optical lens system is set so as to reduce moire noise in the color image sensing device without a low pass filter element:

$$1.5*p*f\# < |LBg-LBe| < 5.0*p*f\#$$

$$1.5*p*f\# < |LBc-LBe| < 5.0*p*f\#$$

where p is a predetermined pitch of a photoelectrically converting pixel of said color image sensing device, LBe is a paraxial back focal length of an e-line (546.07 nm in wavelength), LBg is a paraxial back focal length of a g-line (435.84 nm in wavelength), LBc is a paraxial back focal length of a C-line (656.28 nm in wavelength), and f# is an F-number of said optical lens system.

14. An image sensing apparatus as claimed in claim 13, wherein said apparatus is a film scanner.

15. An image sensing apparatus as claimed in claim 13, wherein said apparatus is a camera.

16. An image sensing apparatus as claimed in claim 13, wherein the following conditions are fulfilled:

$$2.0*p*f\# < |LBg-LBe| < 4.0*p*f\#$$

$$2.0*p*f\# < |LBc-LBe| < 4.0*p*f\#.$$

17. A method for reducing color moire noise, the method comprising the steps of:

providing a color image sensing device for imaging light of each color, and providing an optical lens system which satisfies the following conditions so that longitudinal chromatic aberration of the optical lens system is set so as to reduce moire noise in the color sensing device without a low pass filter element:

$$1.5*p*f\# < |LBg-LBe| < 5.0*p*f\#$$

$$1.5*p*f\# < |LBc-LBe| < 5.0*p*f\#$$

where p is a predetermined pitch of a photoelectrically converting pixel of said color image sensing device, LBe is a paraxial back focal length of an e-line (546.07 nm in wavelength), LBg is a paraxial back focal length of a g-line (435.84 nm in wavelength), LBc is a paraxial back focal length of a C-line (656.28 nm in wavelength), and f# is an F-number of said optical lens system.

18. A method for reducing color moire noise as claimed in claim 17, further comprising the steps of:

generating lacking green image data by interpolation of existing green image data;

creating green image information by combining said existing green data and said thus generated lacking green image data;

creating existing red-green image data by subtracting said green image information from existing red image data;

generating lacking red-green image data by masking said thus created existing red-green image data;

generating combined red-green data by combining said thus created existing red-green image data and said thus generated lacking red-green image data;

creating red image information by adding said green image information to said thus generated combined red-green data;

creating existing blue-green image data by subtracting said green image information from existing blue image data;

generating lacking blue-green image data by masking said thus created existing blue-green image data;

generating combined blue-green data by combining said thus created existing blue-green image data and said thus generated lacking blue-green image data; and creating blue image information by adding said green image information to said thus generated combined blue-green data.

19. An image sensing apparatus comprising:

a color image sensing device for photoelectrically converting imaged light for each color; and an optical lens system for imaging light from an illuminated subject onto the color image sensing device, wherein the optical lens system is adapted to maintain a longitudinal chromatic aberration for reducing color moire noise without a low pass filter element, and wherein the following conditions are fulfilled:

$$1.5*p*f\# < |LBg-LBe| < 5.0*p*f\#$$

$$1.5*p*f\# < |LBc-LBe| < 5.0*p*f\#$$

where p is a predetermined pitch of a photoelectrically converting pixel of said color image sensing device, LBe is a paraxial back focal length of an e-line (546.07 nm in wavelength), LBg is a paraxial back focal length of a g-line (435.84 nm in wavelength), LBc is a paraxial back focal length of a C-line (656.28 nm in wavelength), and f# is an F-number of said optical lens system.

* * * * *

UNITED STATES PATENT AND TRADEMARK OFFICE
CERTIFICATE OF CORRECTION

PATENT NO. : 6,741,760 B2
DATED : May 25, 2004
INVENTOR(S) : Kohtaro Hayashi et al.

It is certified that error appears in the above-identified patent and that said Letters Patent is hereby corrected as shown below:

Title page,
Item [57], ABSTRACT,
Please delete and replace with the following:

-- An image sensing apparatus has an optical lens system and a color image sensing device. The optical lens system forms an image on the color image sensing device by means of light from an illuminated subject. The color image sensing device is a charge coupled device which has a plurality of pixels. The apparatus fulfills the conditions:

$1.5*p*f\# < «LBg-LBe« < 5.0*p*f\#$ $1.5*p*f\# < «LBc-LBe« < 5.0*p*f\#$ where p is a predetermined pitch of a photoelectrically converting pixel of said color image sensing device, LBe is a paraxial back focal length of an e-line (546.07 nm in wavelength), LBg is a paraxial back focal length of a g-line (435.84 nm in wavelength), LBc is a paraxial back focal length of a C-line (656.28 nm in wavelength), and f# is an F-number of said optical lens. --.

Item [73], Assignee, delete "Minaltacco., Ltd.", and insert -- Minolta Co., Ltd. --.

Column 1,
Line 4, insert the new paragraph: -- This application is based on application No. H9-062740 filed in Japan, the content of which is hereby incorporated by reference. --.

Column 10,
Line 24, delete "moire" and insert -- moiré --.

Column 11,
Line 52, delete "moire" and insert -- moiré --.

Column 12,
Lines 11, 19 and 33, delete "moire" and insert -- moiré --.

UNITED STATES PATENT AND TRADEMARK OFFICE
CERTIFICATE OF CORRECTION

PATENT NO. : 6,741,760 B2
DATED : May 25, 2004
INVENTOR(S) : Kohtaro Hayashi et al.

It is certified that error appears in the above-identified patent and that said Letters Patent is hereby corrected as shown below:

Column 13,
Line 5, delete "moire" and insert -- moiré --.

Signed and Sealed this

Fifth Day October, 2004

JON W. DUDAS
*Director of the United States Patent and Trademark Office*